United States Patent [19]

Fredette et al.

[11] 4,414,193

[45] Nov. 8, 1983

[54] PRODUCTION OF CHLORINE DIOXIDE ON A SMALL SCALE

[75] Inventors: Maurice C. J. Fredette; Gerald Cowley, both of Mississauga, Canada

[73] Assignee: ERCO Industries Limited, Islington, Canada

[21] Appl. No.: 418,732

[22] Filed: Sep. 16, 1982

[30] Foreign Application Priority Data

Sep. 9, 1982 [CA] Canada .................................. 411094

[51] Int. Cl.³ ............................................ C01B 11/02
[52] U.S. Cl. ................................... 423/478; 364/500; 364/502
[58] Field of Search .............................. 423/477–480; 364/500, 502

[56] References Cited

U.S. PATENT DOCUMENTS 4,250,159  2/1981  Cowley ............................. 423/480
4,251,224  2/1981  Cowley et al. ..................... 423/478
4,251,502  2/1981  Forster .............................. 423/478
4,251,503  2/1981  Swindells et al. .................. 423/478

FOREIGN PATENT DOCUMENTS 543589   7/1957  Canada ............................... 423/478
825084  10/1969  Canada ............................... 423/478

Primary Examiner—Earl C. Thomas
Attorney, Agent, or Firm—Sim & McBurney

[57] ABSTRACT

Chlorine dioxide for waste water treatment is formed by reaction of sodium chlorate, sodium chloride and sulphuric acid at high acidity while the reaction zone is subjected to subatmospheric pressure and spent reaction medium overflows from the reaction zone. The subatmospheric pressure preferably is applied using a water eductor to which the water to be treated is fed, so that direct contact between the produced gases and the water to be treated is effected.

18 Claims, 5 Drawing Figures

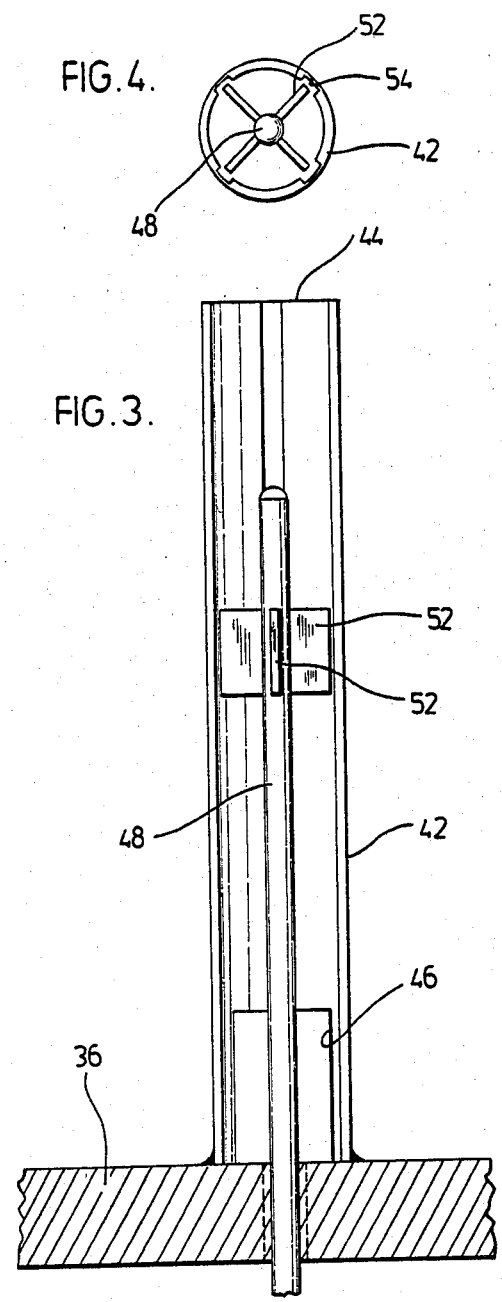

PRODUCTION OF CHLORINE DIOXIDE ON A SMALL SCALE

FIELD OF INVENTION

The present invention relates to the production of chlorine dioxide and the use thereof in the treatment of waste water.

BACKGROUND TO THE INVENTION

The use of chlorine dioxide in the treatment of waste water for disinfection is well known and is known to have advantages over the use of chlorine. Relatively small quantities of chlorine dioxide are required in such use, typically 500 to 2000 lbs/day in a municipal sewage treatment plant of a medium-sized community.

In U.S. Pat. No. 4,250,159, assigned to the assignee herein, there is described an automated small scale chlorine dioxide producing plant wherein sodium chlorate solution is reacted with sulphur dioxide at subatmospheric pressure by countercurrent flow in a reaction tower, to form an aqueous chlorine dioxide solution having a chlorine dioxide concentration of about 1 to 3 gpl.

This prior art procedure suffers from several drawbacks. The prior art process has a relatively low yield of chlorine dioxide of about 60 to 70% based on chlorate, compared with other chlorine dioxide generating processes, which have the potential for much higher yields.

This prior art process also effects the production of chlorine dioxide in the presence of a small amount of air, which necessitates the use of an absorption tower to achieve dissolution of the chlorine dioxide. Many process control elements are required to automate the prior art process for automatic maintenance-free operation. These factors lead to a relatively high capital cost for the plant relative to the chlorine dioxide output.

Other chlorine dioxide producing reactions exist which potentially may be used to generate chlorine dioxide for waste water treatment in rapid, effective and efficient manner. Canadian Pat. No. 543,589, issued to the assignee herein, describes a chlorine dioxide-producing process wherein sodium chlorate, sodium chloride and sulphuric acid at high acidity, in range of 7 to 13 normal, are reacted together at about 30° C. at atmospheric pressure to form chlorine dioxide and chlorine. Air is passed through the reaction medium to strip the gaseous products and to form an air-diluted product gas stream.

Although the latter procedure generally produces chlorine dioxide at a higher yield than the process of U.S. Pat. No. 4,250,159, the process does, however, suffer from certain drawbacks which render it unsuitable for use in an automated water treatment operation. The large volume of diluent air which is present in the product gas stream necessitates a correspondingly large absorption tower to enable the chlorine dioxide to be dissolved in water. Further, the process requires a relatively long residence time of reaction medium in the generator to achieve high yields of chlorine dioxide, resulting in a large volume of generator vessel. Both of these factors result in a relatively high capital cost for the plant relative to the chlorine dioxide output.

Although air is used as diluent gas for the chlorine dioxide in this prior procedure, the process is known to be prone to "puffing", that is the spontaneous decomposition of chlorine dioxide. This feature of the process is undesirable in an unattended automated operation, in view of the potential for equipment damage and the release of noxious gases.

Canadian Pat. No. 825,084, issued to the assignee herein, describes a similar process to that of Canadian Pat. No. 543,589, except that the high acidity reaction medium is maintained as its boiling point under a subatmospheric pressure to result in a product gas stream which contains steam as the diluent gas for the chlorine dioxide and chlorine and the deposition of a sodium acid sulphate in the reaction vessel.

Sodium acid sulphates are difficult to handle physically and exhibit deliquescence. The formation of this salt in a small scale plant which is intended to be relatively maintenance free is a significant drawback. Further, the deposition of a salt in the reaction vessel necessitates the removal of the same in slurry form, the use of a filter to separate crystals from reaction medium, and a recycle pump and recycle pipes for the separated reaction medium. All these items are a significant factor in the overall capital cost of a plant embodying the process of Canadian Pat. No. 825,084.

SUMMARY OF INVENTION

It has now been surprisingly found that the drawbacks of the prior art described above with respect to the utilization thereof for small scale chlorine dioxide production can be overcome by modifying the processes of Canadian Pat. Nos. 543,589 and 825,084.

In accordance with the present invention, there is provided a chlorine dioxide generating process wherein sodium chlorate and sodium chloride solution and sulphuric acid are fed to a reaction zone, chlorine dioxide and chlorine are formed from the resulting high acidity reaction medium in the reaction zone, a subatmospheric pressure is applied to the reaction zone to withdraw a gaseous mixture consisting of water vapor, chlorine dioxide and chlorine, spent reaction medium overflows from the reaction zone and crystallization of a sodium sulphate in the reaction zone is avoided.

No air is fed to the reaction zone, so that the necessity for an absorption tower, and the capital cost associated therewith, is avoided. In this way, the water to be treated may be fed directly to a vacuum eductor used to apply the subatmospheric pressure to the reaction zone, so that any necessity for storage of chlorine dioxide solution is avoided.

The application of a subatmospheric pressure to the reaction zone maintains the partial pressure of chlorine dioxide below the level at which puffing occurs and further ensures that noxious gases are not leaked to the atmosphere upon equipment malfunction.

Further, the process of the invention is able to operate at a much shorter residence time than in the process of Canadian Pat. No. 543,589 to achieve a yield which is much greater than achieved in the process of U.S. Pat. No. 4,250,159, thereby decreasing the generator size requirement, and thereby the overall capital cost.

By operating under concentration conditions which do not permit saturation of the reaction medium by sodium sulphate, and by overflowing reaction medium from the reaction zone, precipitation of a sodium acid sulphate in the reaction zone is avoided, and hence the handling problems and equipment requirements associated therewith are avoided.

GENERAL DESCRIPTION OF INVENTION

The process of the present invention may be operated at a relatively low temperature below about 40° C. down to about 25° C. If desired, the temperature of the reaction medium may be that resulting from the heat of dilution of the sulphuric acid reactant, which is usually fed to the reaction medium in substantially concentrated form.

The water vapor present in the product gas stream at these reaction temperatures has an insufficiently high partial pressure to minimize the possibility of puffing of the chlorine dioxide in the reaction zone, and hence, in the absence of air or other added diluent gas, it is necessary to minimize the vapor space in the reaction zone.

With a system under vacuum, there is a tendency for expansion of the gases in the liquid phase to accelerate removal of the liquid phase from the reaction zone to such an extent that the removal becomes uncontrolled, thereby increasing the vapor space in the reaction zone and thereby increasing the danger of puffing. The ratio of prduction rate to surface area of the reaction medium, therefore, is controlled to prevent such boil over of reaction medium. For a residence time of about 30 minutes, the ratio of production rate to surface area of reaction medium has a maximum value of about 0.05 g/min/cm$^2$.

In a preferred manner of operating the process of the invention, the reaction medium is heated to achieve a higher rate of production for the same surface area of reaction medium. The reaction medium generally is heated to a temperature in the range of about 40° to about 70° C., preferably about 40° to about 60° C.

The increased partial pressure of water vapor which results from the higher temperature of the reaction medium decreases the tendency of the chlorine dioxide to undergo puffing, since the partial pressure of chlorine dioxide is decreased. Minimizing the vapor space in the reaction zone, therefore, is less critical in this embodiment of the invention.

The subatmospheric pressure which is applied to the reaction zone may be such as to effect boiling of the reaction medium and usually varies from about 60 to about 160 mm Hg for a boiling reaction medium. Boiling conditions are preferred since chlorine dioxide is stripped from the reaction medium by the steam which forms. When the reaction medium is not boiling, then the subatmospheric pressure usually varies from about 60 to about 135 mm Hg.

BRIEF DESCRIPTION OF DRAWINGS

FIG. 3 is a close-up of a heater tube used in the chlorine dioxide generator of FIG. 2;

FIG. 4 is an end view of the heater tube of FIG. 3; and

DESCRIPTON OF PREFERRED EMBODIMENT

Figure 1:
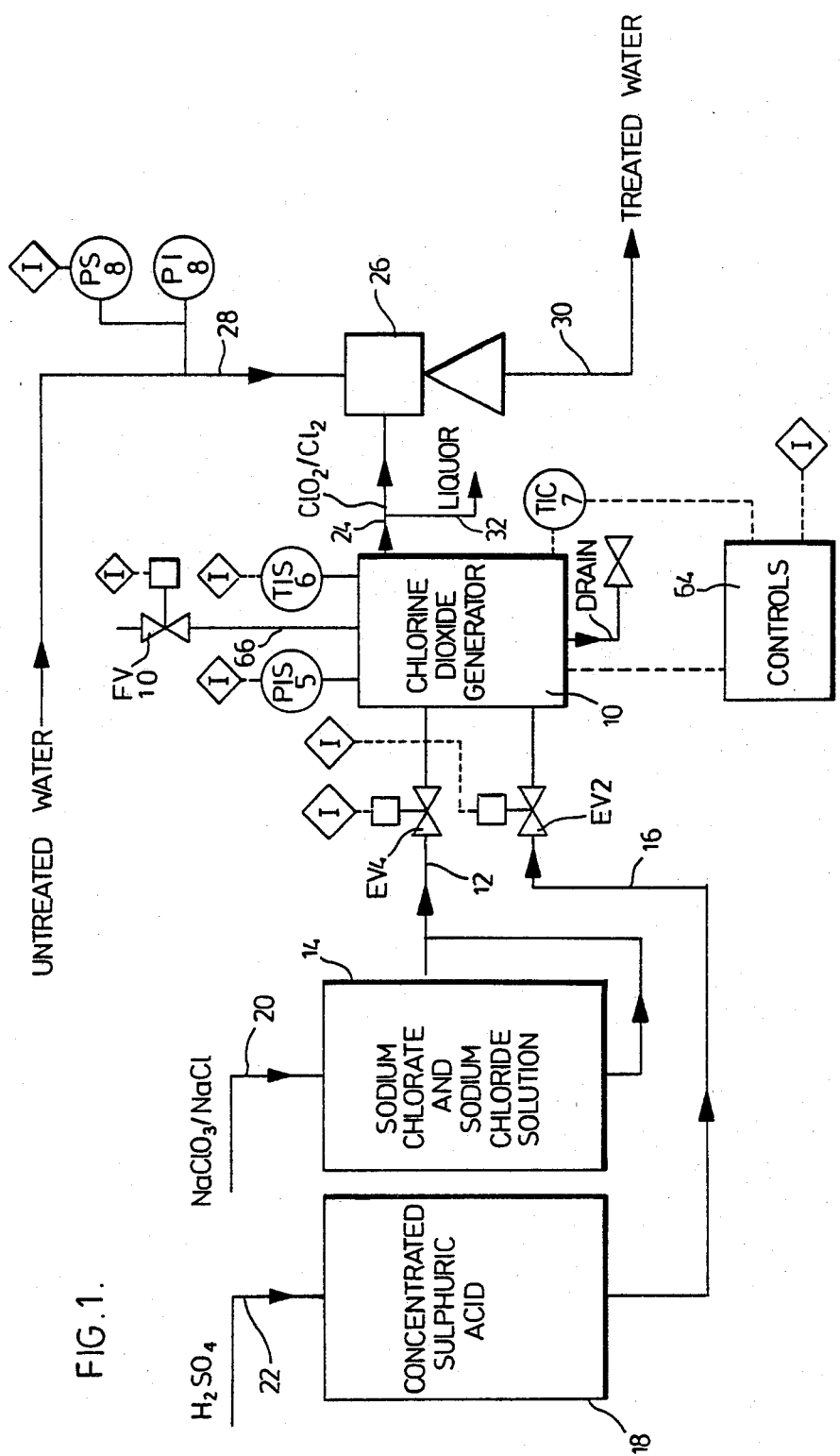
FIG. 1 is a schematic flow sheet of one embodiment of the process of the invention.

Referring first to FIG. 1, which is a schematic flow sheet of one embodiment of the invention, chlorine dioxide and chlorine are formed in a chlorine dioxide generator 10 to which an aqueous solution of sodium chlorate and sodium chloride is fed by line 12 from a storage tank 14 and to which sulphuric acid is fed by line 16 from a storage tank 18. The sodium chlorate and sodium chloride solution storage tank 14 is replenished, as required, by line 20 while the sulphuric acid storage tank 18 is replenished, as required, by line 22.

The concentration of sulphuric acid which is fed by line 16 to the chlorine dioxide generator 10 may vary widely. It is usually preferred to utilize a concentrated sulphuric acid solution, preferably greater than about 93 wt. % $H_2SO_4$, to minimize acid losses due to overflow from the generator 10. The feed of sulphuric acid produces an acidity in the reaction medium of about 8 to about 12 normal, preferably about 9.5 to 10 normal.

The concentrations of sodium chlorate and sodium chloride in the feed solution in line 12 may vary over a relatively narrow range depending on the other conditions of the reaction medium. When the process is effected at a reaction medium temperature of less than about 40° C., the concentration of each of sodium chlorate and sodium chloride usually is from about 2.5 to about 3.5 molar, preferably about 3.0 to about 3.5 molar, while when the process is effected at a reaction medium temperature in the range of about 40° C. to about 70° C., the concentrations are each usually about 1.5 to about 2.5, preferably about 1.9 to about 2.5. The mole ratio of chloride ion to chlorate ion in the feed stream is preferably in the range of about 1.05 to about 1.15:1 to compensate for inefficiency in the production of chlorine dioxide from the reactants.

The concentrations of sodium chlorate and sodium chloride in the reaction medium resulting from these feeds are each about 0.05 to about 0.2 molar. Preferably, the concentrations are maintained at as low a concentration as possible so as to minimize the loss of unreacted sodium chlorate from the reaction medium.

The reaction medium in the chlorine dioxide generator 10 is preferably heated to a preferred temperature of about 50° to 60° C., while a subatmospheric pressure is applied to the reaction zone through product line 24, preferably to effect boiling of the reaction medium.

The reaction medium overflows from the generator 10 through product line 24. The residence time of the reaction medium in the generator 10 is not critical, provided that the concentration of sodium sulphate is not allowed to build up to saturation and the reactants are given sufficient time to form chlorine dioxide and chlorine. The residence time of reaction medium in the generator 10 is typically about 30 to 60 minutes, to permit a small sized generator 10 to be used, although higher residence times, with consequently larger-sized generators, may be used, so long as precipitation does not occur.

A vacuum eductor 26 is provided at the downstream end of the product line 24 to apply the vacuum to the generator 10 through line 24. The vacuum eductor 26 has a feed of water 28 which condenses the steam and dissolves the chlorine dioxide and chlorine entering the eductor 26 through line 24. The water feed in line 28 may take the form of the aqueous stream which is to be treated by the chlorine dioxide, so that treated water results in line 30 on the downstream side of the eductor 26.

Substantially complete dissolution of chlorine dioxide and chlorine occur in the eductor 26, although a tail pipe may be added to the eductor 26 to ensure that complete dissolution of the gases occurs prior to the water stream coming into contact with the atmosphere, so that no noxious gases escape. The concentration of chlorine dioxide required in the treated water to effect disinfection is quite low, usually below about 3 gpl. Accordingly, the temperature of the water in line 28 may be ambient temperature, and does not require chilling, as otherwise would be the case if a greater concentration of chlorine dioxide were required.

The liquor overflowing from the generator 10 may be allowed to pass, along with the gaseous products of the reaction, into the eductor 26, the concentrations of the chemicals therein being insufficient to significantly adversely affect the utility of the treated water in line 30. Alternatively, the overflow reaction medium may be drained from the product line 24 by line 32 to disposal.

Figure 2:
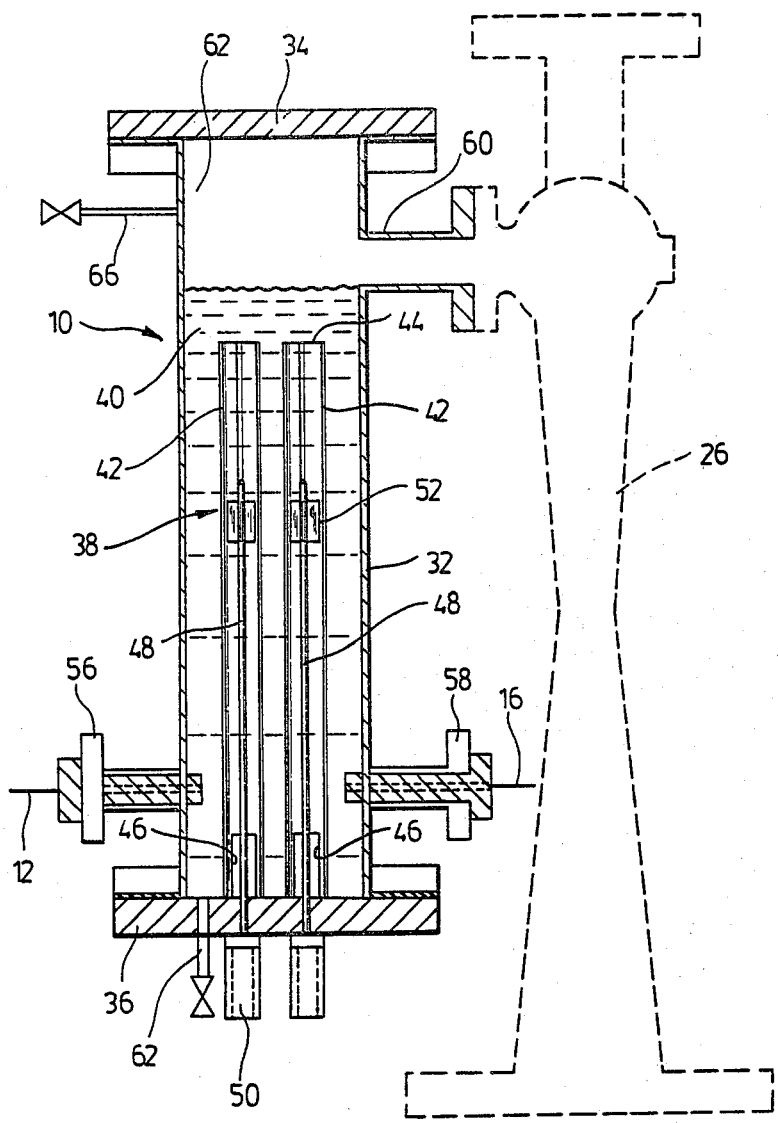
FIG. 2 is a sectional view of a chlorine dioxide generator for use in the process of FIG. 1.

Referring now to FIGS. 2 to 4, there is illustrated therein the construction of a chlorine dioxide generator 10 suitable for use in the procedure of FIG. 1. The generator 10 has a generally right cylindrical body 32 having upper and lower closure members 34 and 36 defining an enclosed chamber 38 constituting a reaction zone holding reaction medium 40.

Extending upwardly within the chamber 38 from the lower closure 36 in generally parallel manner are four draft tubes 42, only two of which are shown. Each draft tube 42 has an open upper end 44 and openings 46 formed in the wall thereof adjacent the lower end, so that each of the draft tubes 42 is open to liquor flow at both ends.

A heater element 48 extends axially in each draft tube 42 for a substantial length thereof and projects through the lower closure 36 to a terminal connector 50 located exterior to the generator 10. The upper end of each heater element 48 is provided with radially-projecting fin elements 52 which are received in riflings 54 in the inner wall of the draft tube 42. This arrangement stabilizes the position of the heater element 48 in the draft tube 42.

The surface area of the heater element 48 should be large enough to dissipate heat efficiently, so that the surface temperature of the heater element 48 is sufficiently low not to cause localized formation of large gas bubbles and chlorine dioxide decomposition. Preferably, the heater element surface temperature is below about 90° C. and is such that the temperature differential between the heater element and the reaction medium is insufficient to cause the crystallization of sodium sulphate on the heater element 48.

Inlet pipes 56 and 58 extend through the wall 32 of the generator 10 adjacent the lower end thereof for feed of reactants into the reaction medium 40 in the enclosed chamber 38. One inlet pipe 56 is intended to communicate with the sodium chlorate and sodium chloride feed solution in line 12 while the other inlet pipe 58 is intended to communicate with the sulphuric acid feed in line 14.

An outlet pipe 60 constituting product line 24 is provided adjacent the upper end of the generator 10 and communicating with the vapor space 62 above the reaction medium 40 in the enclosed chamber 38. The reaction medium 40 overflows the generator 10 through the pipe 60.

The flow rates of reactants entering the generator 10 through lines 56 and 58 are controlled to provide the desired residence time in the generator 10 and the desired reactant concentrations in the generator 10. A drain line 62 is provided for draining the generator 10 of reaction medium, if desired.

The overall system illustrated in FIG. 1 is provided with a variety of sensors identified below and controls 64 to permit manual or automatic operation.

OPERATION

Figure 5:
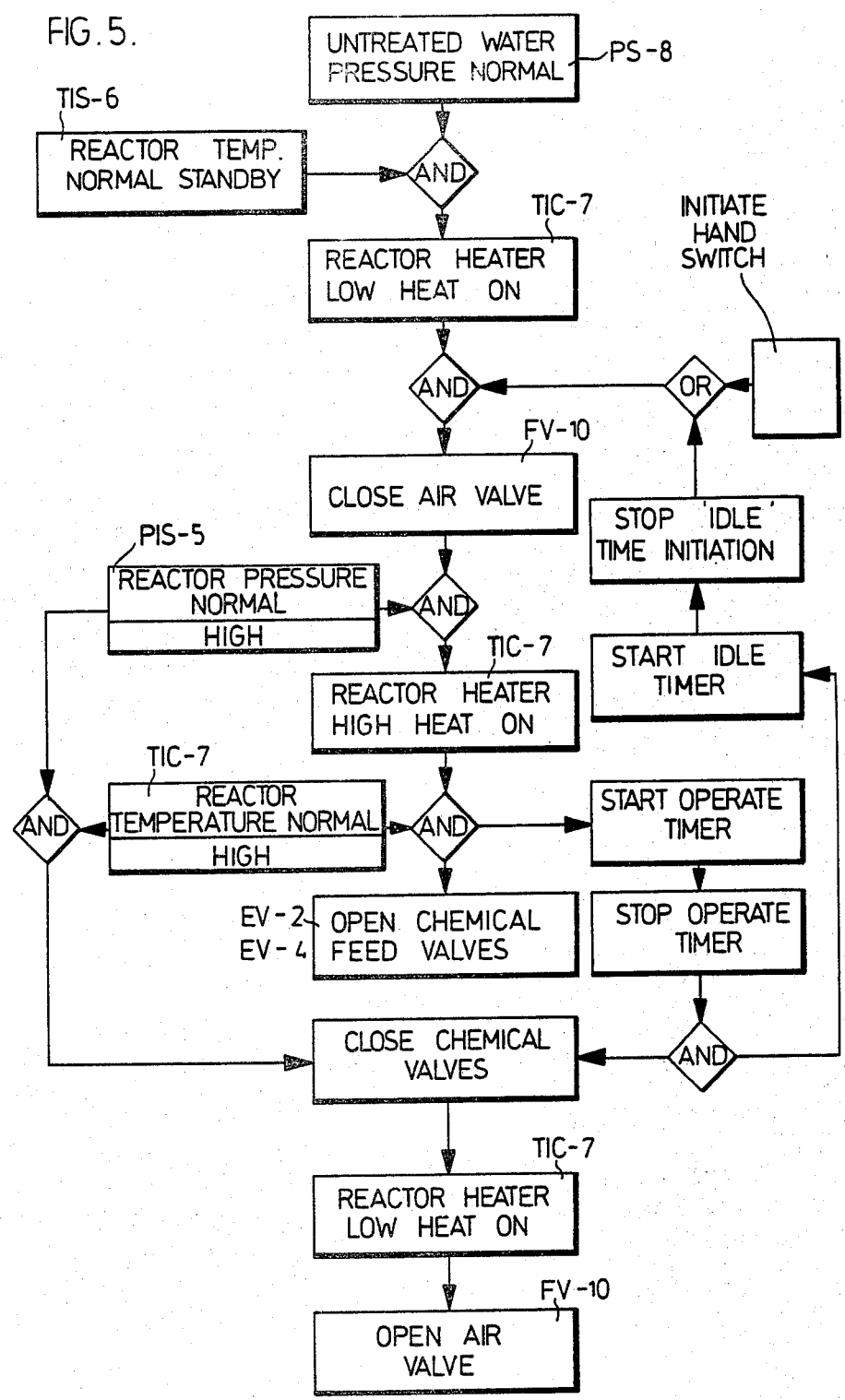
FIG. 5 is a logic flow diagram of the automatic operation of the process of FIG. 1.

In operation, the overall system illustrated in FIG. 1 sequences in accordance with a predetermined series of steps outlined in the logic flow diagram of FIG. 5. Initiation of chlorine dioxide formation and water treatment may be effected manually or in response to requirements for the treatment of water.

Sensed values of certain parameters are checked in turn by suitable sensors to ensure they are within allowable limits prior to further operation. The following Table I identifies the parameters checked, their "normal" values and the sensor used:

TABLE I

| Parameter | Normal Value | Sensor |
|---|---|---|
| Untreated Water pressure in line 28 | 50 to 70 psig | PS-8 |
| Generator standby temperature | 36° to 40° C. | TlS-6 |
| Generator heater low heat | On | TlC-7 |

In the event that any of these parameters is outisde the allowable limit, the plant shuts down automatically and requires manual reset after correction of the defective parameter.

In the event that the parameters are within the allowable limits, the start-up sequence is initiated. Air valve FV-10 located in an air purge line 66 to the generator 10 is closed. Next, the generator pressure is sensed by sensor P1S-5 to determine whether or not it is "normal", the generator heater is turned to high heat and the reaction medium temperature sensed by sensor T1C-7 to determine whether or not it is "normal" while the vapor temperature is reused by sensor T1S-6 to determine whether or not it is also "normal".

The following Table II sets forth the "normal" values for the generator pressure and temperature:

TABLE II

| Parameter | Normal Value | Sensor |
|---|---|---|
| Generator Pressure | 60 to 160 mm Hg | PlS-5 |
| Reaction medium Temperature | 40 to 70° C. | |
| Vapor temperature | below 80° C. | TlS-6 |

In the event that the parameters are within the allowable limits, chemical feed is commenced by opening valves EV-4 and EV-2 in lines 12 and 16 respectively. At the same time, a timer is started, which controls the period of time within which chlorine dioxide and chlorine are produced in the generator 10.

The pressure and temperatures in the generator 10 are continuously monitored by sensors P1S-5, T1S-6 T1C-7 during the generation of chlorine dioxide. In the event of the sensed generator pressure being high and/or one of the sensed generator temperatures being high, the generator shuts down.

Assuming that no alarm condition such as just described occurs, when the timer has completed its cycle, the genertor 10 is shut down as the desired quantity of chlorine dioxide is made, as predetermined by the timer. Shut down of the generator involves shut off of the reactant feeds by closing valves EV-2 and EV-4 and switching of the generator heaters to the low setting. The closure of the valves EV-2 and EV-4 and shut off of the heater causes chlorine dioxide generation to cease. Air valve FV-10 is opened, to allow air to be drawn into the vapor space in the generator 10 and to vent any residual chlorine dioxide and chlorine from the generator 10 under influence of the venturi 26.

The generator 10 now assumes a rest condition, with the timer in an idle mode until initiation of the production of chlorine dioxide again is required to be effected, either in response to the predetermined passage of time or upon manual initiation.

The shut down of the generator 10 is faster in the case of a boiling reaction medium than in the case of the non-boiling reaction medium since steam stripping of the chlorine dioxide maintains the dissolved chlorine dioxide concentration in the reaction medium at about 0.5 gpl, as compared with the non-boiling case where the dissolved chlorine dioxide concentration is about 3 to 3.5 gpl.

The chlorine dioxide generating system depicted in FIG. 1, therefore, is able to rapidly initiate the production of chlorine dioxide and chlorine for waste water treatment, sustain such production at a desired production rate for a predetermined period of time and rapidly and safely shut down the production of chlorine dioxide and chlorine.

Relatively few automatic controls are required, when compared with U.S. Pat. No. 4,250,159, and the process is much easier to operate in an automated form than is the case with U.S. Pat. No. 4,250,159. In addition, since no air is present, an absorption tower, such as is required in the prior art of U.S. Pat. No. 4,250,159, no longer is required. Furthermore, the yield of chlorine dioxide which is attainable using the process of the invention is further than attained in the prior art of U.S. Pat. No. 4,250,159.

EXAMPLES

Example 1

A mass balance for the system of FIG. 1 was determined by a non-boiling chlorine dioxide generator 10 producing 5 lb/hr of chlorine dioxide at 40° C. and 110 mm Hg and treating 75,000 lb/hr of water.

The various parameters are set forth in the following Table III:

TABLE III

| Line no. | lb/hr | | | | |
|---|---|---|---|---|---|
| | 28 | 12 | 16 | 24 | 30 |
| Chemical | | | | * | |
| NaCl | | 5.17 | | 0.26 | 0.26 |
| NaClO$_3$ | | 9.08 | | 0.93 | 0.93 |
| ClO$_2$ | | | | 5 | 5 |
| Cl$_2$ | | | | 2.78 | 2.78 |
| H$_2$SO$_4$ | | | 29.5 | 21.3 | 21.3 |
| H$_2$O (liquid) | 75,000 | 21 | 1.2 | 21.5 | 75023.5 |
| H$_2$O (gas) | | | | 2.0 | |

Example 2

A mass balance for the system of FIG. 1 was determined for a boiling chlorine dioxide generator 10 producing 5 lb/hr of chlorine dioxide at 60° C. and 110 mm Hg and treating 75,000 lb/hr of water.

The various parameters are set forth in the following Table IV:

TABLE IV

| Line No. | lb/hr | | | | |
|---|---|---|---|---|---|
| | 28 | 12 | 16 | 24 | 30 |
| Chemical | | | | | |
| NaCl | | 5.17 | | 0.26 | 0.26 |
| NaClO$_3$ | | 9.08 | | 0.93 | 0.93 |
| ClO$_2$ | | | | 5 | 5 |
| Cl$_2$ | | | | 2.78 | 2.78 |
| H$_2$SO$_4$ | | | 29.5 | 21.3 | 21.3 |
| H$_2$O (liquid) | 75,000 | 34 | 1.2 | 21.5 | 75036.5 |
| H$_2$O (gas) | | | | 15 | |

Although only 13 lb/hr of water more is required in the higher temperature procedure of Example 2 as compared to Example 1, the difference is significant, in that the partial pressure of chlorine dioxide is vastly decreased from 36 mm to 9 mm and hence the safety margin with respect to the possibility of puffing is improved.

Example 3

Chlorine dioxide was produced in a cylindrical chlorine dioxide generator containing reaction medium heated to about 60° C. under a subatmospheric pressure to effect boiling of the reaction medium. Continuous flows of sodium chlorate and sodium chloride solution and of sulphuric acid were maintained while reaction medium overflowed the generator.

The procedure was effected for two diameters of generator with the liquor filling approximately two-thirds of the generator volume and the results compared with those for an unheated generator of the same diameter as the larger-diameter generator but of decreased height, so that the liquor filled the generator. The results are reproduced in the following Table V:

TABLE V

| Reactor Dia (cm) | Liquor volume (l) | Production Rate (g/min) | Yield (%) | Residence Time (min) | Ratio of Production Rate to Reactor Size (g/min/cm$^2$) |
|---|---|---|---|---|---|
| 10.2 | 3 | 5 | 91 | 70 | 0.06 |
| 10.2 | 3 | 5 | 89 | 70 | 0.06 |
| 10.2* | 1 | 5 | 92 | 25 | 0.05 |
| 7.6 | 1 | 5 | 72 | 25 | 0.11 |
| 7.6 | 1 | 5 | 82 | 25 | 0.11 |

*This run is effected without heating and without gas space.

The results of the above Table V show that the ratio of production rate to reactor size in a boiling reactor may be substantially increased, although at a loss of some yield.

SUMMARY OF DISCLOSURE

In summary of this disclosure, the present invention provides a novel procedure for the preparation of chlorine dioxide for effecting waste water treatment also for cooling water and potentially for potable water. Modifications are possible within the scope of the invention.

What we claim is:

1. A process for the production of chlorine dioxide, which comprises:
    reducing chlorate ions with chloride ions in an aqueous acid reaction medium to form chlorine dioxide and chlorine, said reaction medium containing sulphuric acid, having a total acid normality of about 8.5 to about 12 normal and containing by-product sulphate salt in a concentration insufficient to saturate the same, subjecting said reacting zone to a subatmospheric pressure to draw said chlorine dioxide and chlorine from said reaction zone along with water vapor, feeding chlorate ions, chloride ions and sulphuric acid reactants to said reaction zone and removing spent reaction medium from the reaction zone at a flow rate which substantially balances the flow of water into the reaction zone with said reactants and out of the reaction zone with said water vapor and said removal spent reaction medium, and controlling the residence time of reaction medium in said reaction zone to maintain said concentration of by-product sulphate salt insufficient to saturate said reaction medium.

2. The process of claim 1 wherein said reaction medium has a total acid normality of about 9.5 to 10.

3. The process of claim 1 wherein the chlorate ion concentration in said reaction medium is about 0.05 to about 0.2 molar and the chloride ion concentration in said reaction medium is about 0.05 to about 0.2 molar.

4. The process of claim 1, 2 or 3 wherein said residence time of reaction medium in said reaction zone is controlled to maintain the concentration of chlorate ion in said spent reaction medium as low as possible, thereby to minimize the concentration of chlorate ion in said spent reaction medium while avoiding crystallization of said by-product sulphate in said reaction zone.

5. A process for the production of chlorine dioxide, which comprises;

feeding to a reaction zone an aqueous solution of sodium chlorate and sodium chloride each having a concentration of about 1.5 to about 3.5 molar such that the mole ratio of chloride ions to chlorate ions of about 1.05:1 to about 1.15:1, feeding sulphuric acid to said reaction zone to form therein an aqueous acid reaction medium having a total acid normality of about 8 to about 12 normal and containing chlorate ions and chloride ions, reducing chlorate ions with chloride ions in said aqueous acid reaction medium to form chlorine dioxide and chlorine, subjecting said reaction zone to a subatmospheric pressure to draw said chlorine dioxide and chlorine from said reaction zone along with water vapor, removing spent reaction medium from said reaction zone at a flow rate which substantially balances the flow of water into the reaction zone with said sulphuric acid and aqueous solution of sodium chlorate and sodium chloride and out of the reaction zone with said water vapor and said removed spent reaction medium, and controlling the residence time of reaction medium in said reaction zone to maintain the concentrations of sodium chlorate and sodium chloride each in the range of about 0.05 to about 0.2 molar and the concentration of by-product sodium sulphate insufficient to saturate the reaction medium.

6. The process of claim 5 wherein said total acid normality of reaction medium is about 9.5 to 10.

7. The process of claim 5 wherein said residence time of reaction medium in said reaction zone is about 30 to about 60 minutes.

8. The process of claim 5, 6 or 7 wherein said reaction medium has a temperature of about 25° to about 70° C.

and said reaction zone is subjected to a subatmospheric pressure of about 60 to about 160 mm Hg.

9. The process of claim 8 wherein said reaction medium has a temperature below about 40° C. and said reaction medium substantially fills said reaction zone.

10. The process of claim 9, wherein said concentrations of sodium chlorate and sodium chloride in said aqueous solution are each about 2.5 to about 3.5 molar.

11. The process of claim 9 wherein said reaction medium is heated to a temperature of about 40° to about 70° C.

12. The process of claim 11 wherein said reaction medium temperature is about 50° to about 60° C.

13. The process of claim 11 wherein said subatmospheric pressure has a value which causes said reaction medium to boil.

14. The process of claim 11 wherein said concentrations of sodium chlorate and sodium chloride in said aqueous solution are each about 1.5 to about 2.5 molar.

15. The process of claim 5 wherein said spent reaction medium is removed from said reaction zone by permitting said reaction medium to overflow from the reaction zone through an outlet through which said chlorine dioxide and chlorine are also drawn.

16. The process of claim 15 wherein said subatmospheric pressure is applied to said reaction zone by a vacuum eductor communicating with said outlet.

17. The process of claim 16 wherein said chlorine dioxide and chlorine are used to treat water to disinfect the same by flowing the water to be treated through said vacuum eductor, whereby chlorine dioxide and chlorine drawn from the reaction zone directly into contact with the water to be treated in said eductor and the drawn chlorine dioxide and chlorine are dissolved in the water to be treated.

18. The process of claim 17, wherein production of chlorine and chlorine by said process is initiated and terminated in accordance with requirements therefor, and including:

sensing the temperature of reaction medium in said reaction zone to ensure that said temperature is about 36° to 40° C., sensing the pressure of untreated water to ensure that said pressure is about 50 to 70 psig, sensing the pressure in said reaction zone to ensure that said pressure is about 60 to about 160 mm Hg, initiating heating of said reaction medium and sensing the temperature of said reaction medium to ensure that said temperture is about 40° to about 70° C., initiating flow of sulphuric acid to said reaction zone and maintaining said flow during chlorine dioxide production, initiating flow of an aqueous solution of sodium chlorate and sodium chloride to said reaction zone and maintaining said flow during chlorine dioxide production, and upon completion of the required chlorine dioxide production;

ceasing heating of reaction medium, ceasing said flow of sulphuric acid to said reaction zone, ceasing said flow of aqueous solution of sodium chlorate and sodium chloride to said reaction zone, and permitting air to flow into said reaction zone under the influence of the vacuum applied by said water eductor to purge gases from said reaction zone.

* * * * *